US009937516B2

(12) United States Patent
Tomuta et al.

(10) Patent No.: US 9,937,516 B2
(45) Date of Patent: Apr. 10, 2018

(54) BRUSHES FOR DELIVERING GLUTINOUS SUBSTANCE TO WORKPIECE FROM END-EFFECTOR AND METHODS FOR MAKING THE SAME

(71) Applicant: The Boeing Company, Chicago, IL (US)

(72) Inventors: Raul Tomuta, Stanton, CA (US); Frederick B. Frontiera, Mt. Pleasant, SC (US); Angelica Davancens, Reseda, CA (US); Martin Guirguis, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/143,235

(22) Filed: Apr. 29, 2016

(65) Prior Publication Data
US 2017/0105514 A1 Apr. 20, 2017

Related U.S. Application Data

(60) Provisional application No. 62/242,216, filed on Oct. 15, 2015.

(51) Int. Cl.
A46B 11/00 (2006.01)
B05C 9/02 (2006.01)
(Continued)

(52) U.S. Cl.
CPC ............... B05C 9/02 (2013.01); A46B 11/06 (2013.01); A46B 13/04 (2013.01); B05C 5/02 (2013.01);
(Continued)

(58) Field of Classification Search
CPC .... A46B 11/0006; A46B 11/06; A46B 11/063
(Continued)

(56) References Cited

U.S. PATENT DOCUMENTS 1,314,441 A   8/1919  Stensrud
1,979,240 A   11/1934 Adelmann
(Continued)

FOREIGN PATENT DOCUMENTS

DE   102008039804   2/2010
EP      2842457     3/2015

OTHER PUBLICATIONS

Aerospace Dispensing Systems, Fori's New Aerospace Division Blog dated Oct. 3, 2013, http://fori-aerospace.blogspot.com/2013/10/aerospace-dispensing-systems.html, Fori Automation, Inc., accessed Jun. 2, 2016.
(Continued)

Primary Examiner — Jennifer C Chiang
(74) Attorney, Agent, or Firm — Kunzler, PC

(57) ABSTRACT

A brush (400) for delivering a glutinous substance (168) to a workpiece (170) from an end-effector (102) is disclosed. The brush (400) comprises a body (402), having a rotational axis (438). The brush (400) also comprises a shaft (404), coupled to the body (402) and coaxial with the rotational axis (438). Additionally, the brush (400) comprises a tube (430), having a first end (411) and a second end (412), opposite the first end (411). The tube (430) comprises a first channel (408), coaxial with the rotational axis (438) and having an inlet (409) and an outlet (480). Furthermore, the tube (430) extends from the body (402) in a first direction (A) along the rotational axis (438), to the second end (412). The brush (400) further comprises bristles (420) that surround a portion of the tube (430), wherein the bristles (420) extend from the body (402) in the first direction (A).

28 Claims, 13 Drawing Sheets

(51) Int. Cl.
  *B25J 9/16* (2006.01)
  *B25J 11/00* (2006.01)
  *B05C 5/02* (2006.01)
  *B05D 7/24* (2006.01)
  *B05C 11/10* (2006.01)
  *A46B 13/04* (2006.01)
  *A46B 11/06* (2006.01)
  *B05C 1/02* (2006.01)
  *B05C 1/06* (2006.01)

(52) U.S. Cl.
  CPC .......... *B05C 11/10* (2013.01); *B05C 11/1002* (2013.01); *B05D 7/24* (2013.01); *B25J 9/1679* (2013.01); *B25J 9/1692* (2013.01); *B25J 11/0075* (2013.01); *B05C 1/027* (2013.01); *B05C 1/06* (2013.01); *Y10S 901/02* (2013.01)

(58) Field of Classification Search
  USPC ........................................................ 401/289
  See application file for complete search history.

(56) References Cited

U.S. PATENT DOCUMENTS

| | | | |
|---|---|---|---|
| 2,590,977 A | 4/1952 | Gordon | |
| 2,747,217 A | 5/1956 | Stahl | |
| 3,860,987 A | 1/1975 | Bolli et al. | |
| 4,570,282 A | 2/1986 | Martin et al. | |
| 4,881,289 A | 11/1989 | Nagata et al. | |
| 5,027,463 A | 7/1991 | Daub | |
| 5,171,095 A | 12/1992 | Davies et al. | |
| 8,651,046 B1 | 2/2014 | Davancens et al. | |
| 2005/0003077 A1 | 1/2005 | Kamata et al. | |
| 2007/0026773 A1 | 2/2007 | Vogel | |
| 2007/0050938 A1 | 3/2007 | Rosenzweig | |
| 2009/0008398 A1 | 1/2009 | Nakatsuji et al. | |
| 2009/0080964 A1 | 3/2009 | Castellana | |
| 2014/0234011 A1 | 8/2014 | Tomuta et al. | |
| 2015/0064357 A1* | 3/2015 | Tomuta ................ | A46B 11/063 427/429 |
| 2017/0105512 A1 | 4/2017 | Pringle et al. | |
| 2017/0105513 A1 | 4/2017 | Davancens et al. | |
| 2017/0105516 A1 | 4/2017 | Pringle et al. | |
| 2017/0106538 A1 | 4/2017 | Pringle et al. | |

OTHER PUBLICATIONS

Extended European Search Report for EP Application No. 16193053.2 dated Mar. 2, 2017.
Extended European Search Report for EP Application No. 16193055.7 dated Mar. 6, 2017.

* cited by examiner

BRUSHES FOR DELIVERING GLUTINOUS SUBSTANCE TO WORKPIECE FROM END-EFFECTOR AND METHODS FOR MAKING THE SAME

BACKGROUND

It is commonplace to apply glutinous substances, such as sealants, adhesives, and fillers, to surfaces of structures or other objects for purposes of sealing, corrosion resistance, and/or fixation, among others. However, surface application of glutinous substances in an efficient, predictable, and uniform manner using manual techniques is difficult and time consuming.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a brush for delivering a glutinous substance to a workpiece from an end-effector. The brush comprises a body, having a rotational axis. The brush also comprises a shaft, coupled to the body and coaxial with the rotational axis. The shaft is harder than the body. Additionally, the brush comprises a tube, passing through at least a portion of the body and through at least a portion of the shaft and having a first end and a second end, opposite the first end. The tube has an outer diameter, is softer than the body, and comprises a first channel, coaxial with the rotational axis and having an inlet, located at the first end of the tube, and an outlet, opposite the inlet, located at the second end of the tube. Furthermore, the tube extends from the body, in a first direction along the rotational axis, to the second end. The brush further comprises bristles, arranged in a thatch that surrounds a portion of the tube. The bristles extend from the body in the first direction.

Another example of the subject matter according to the present disclosure relates to a method of making a brush, configured to deliver a glutinous substance to a workpiece from an end-effector. The method comprises coupling bristles, arranged in a thatch, to a body around a tube that passes through at least a portion of the body and through at least a portion of a shaft, coupled to the body, such that the thatch extends from the body along a rotational axis of the body. Additionally, the method comprises removing first portions of at least a plurality of the bristles to form a first recess in the thatch.

BRIEF DESCRIPTION OF THE DRAWINGS

Figure 1:
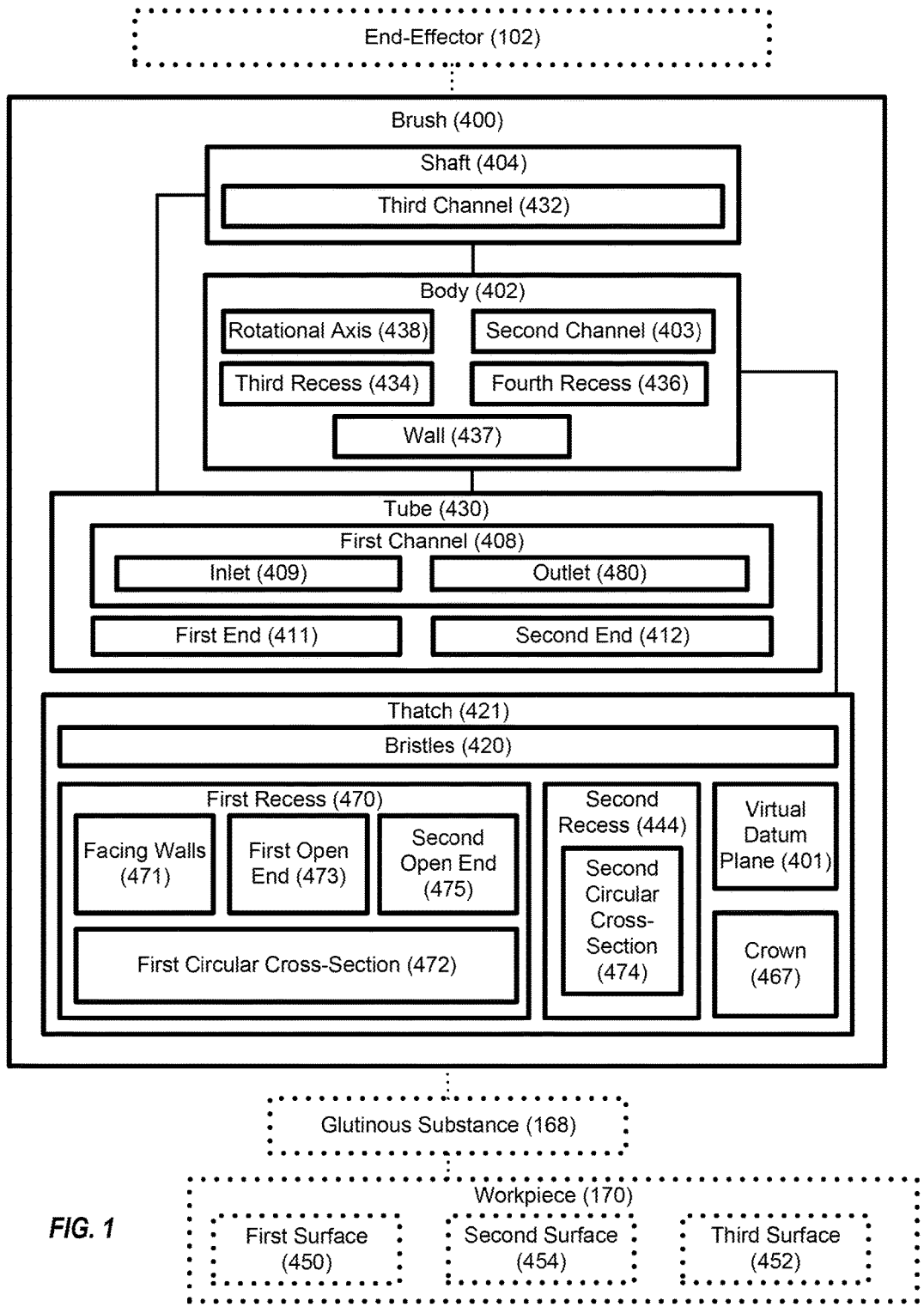
Figure 2:
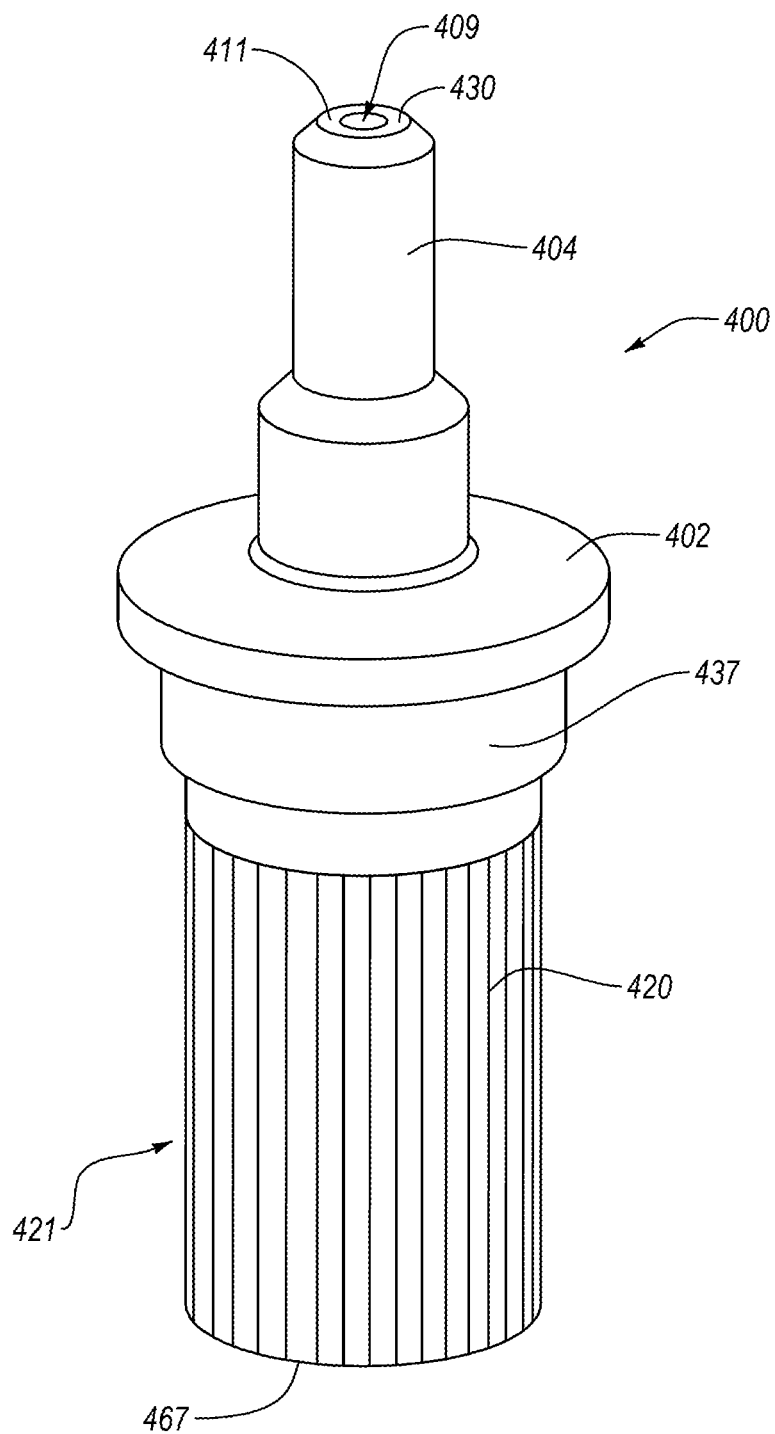
Figure 3A:
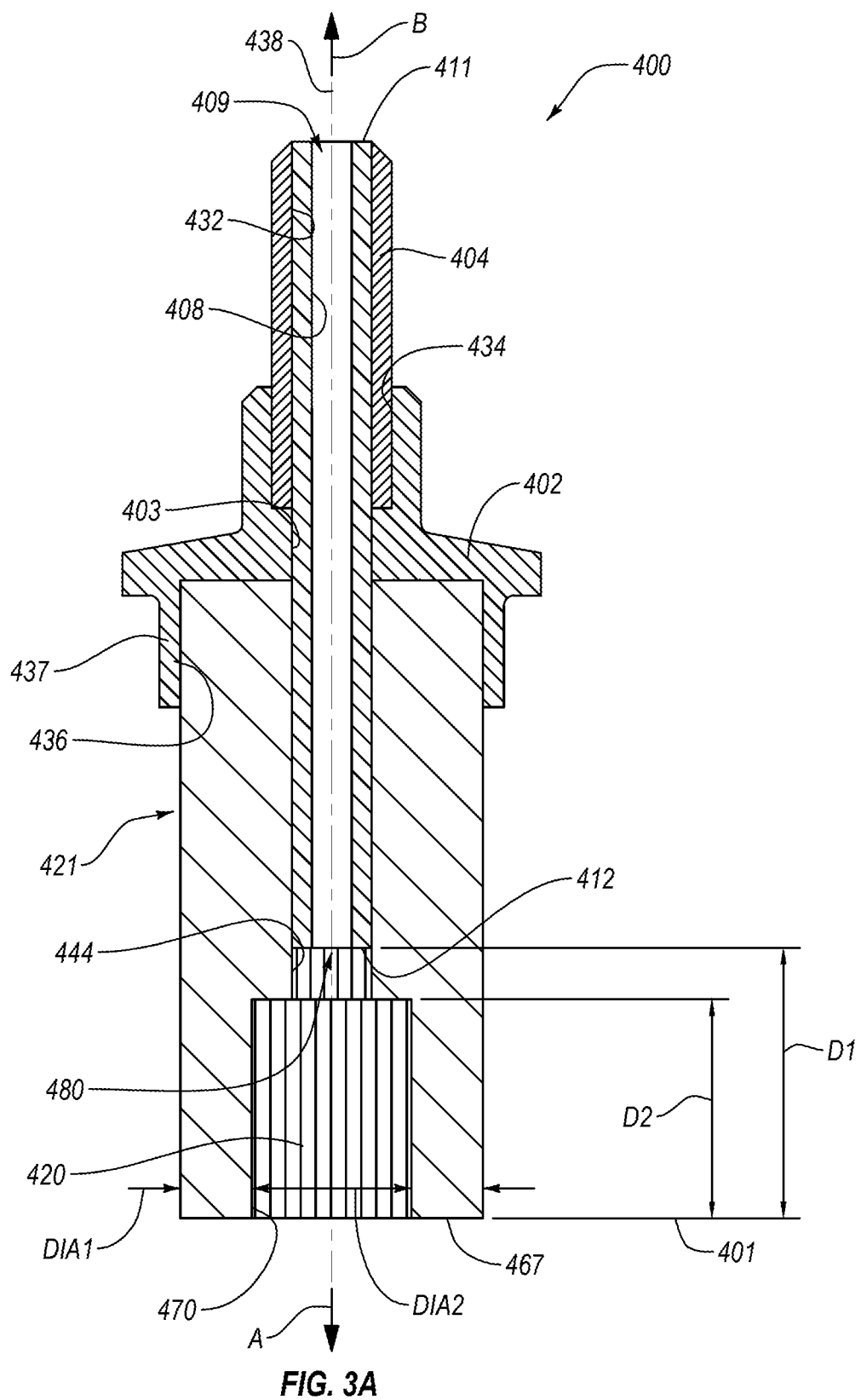
Figure 3B:
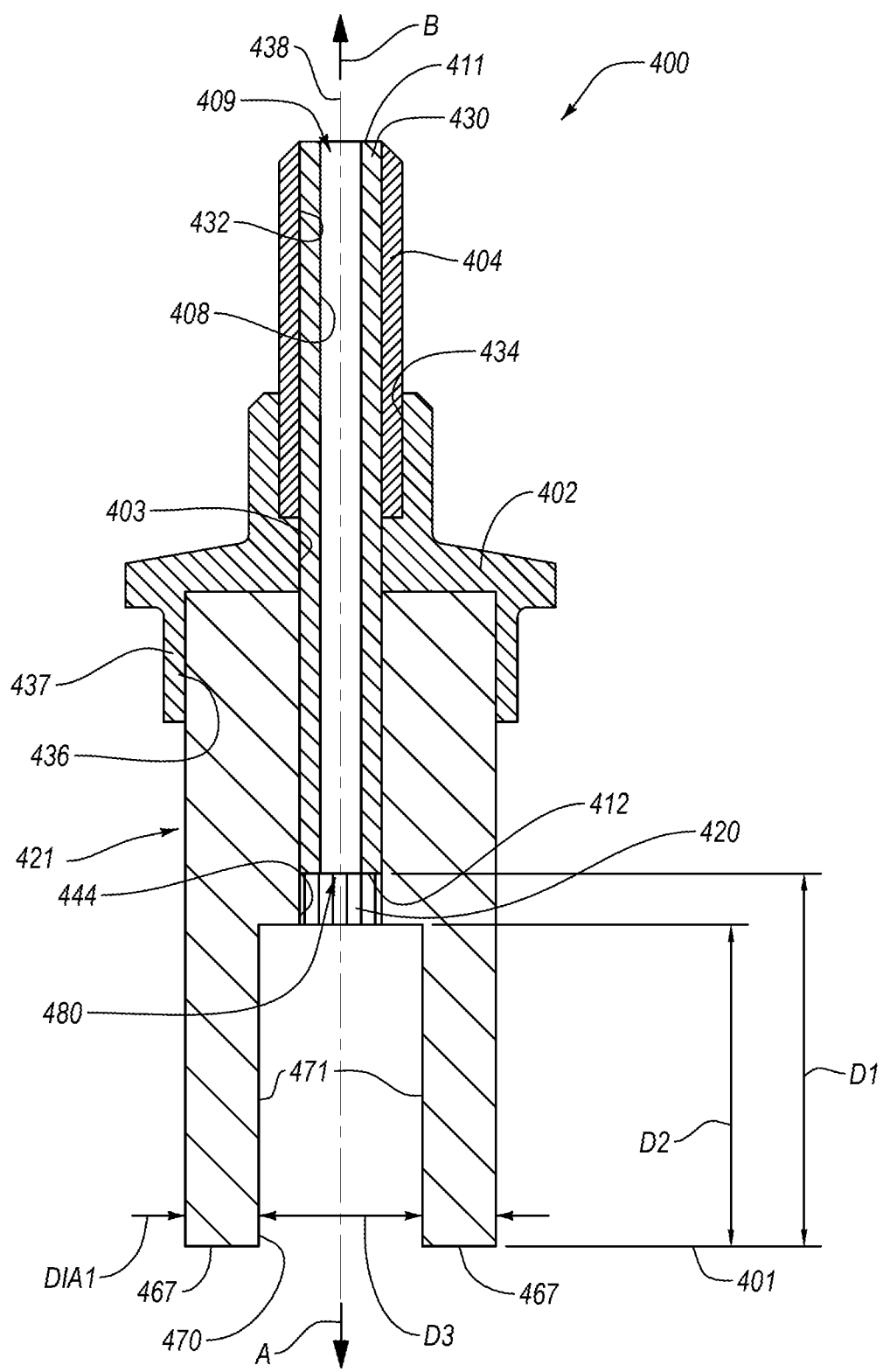
Figure 4A:
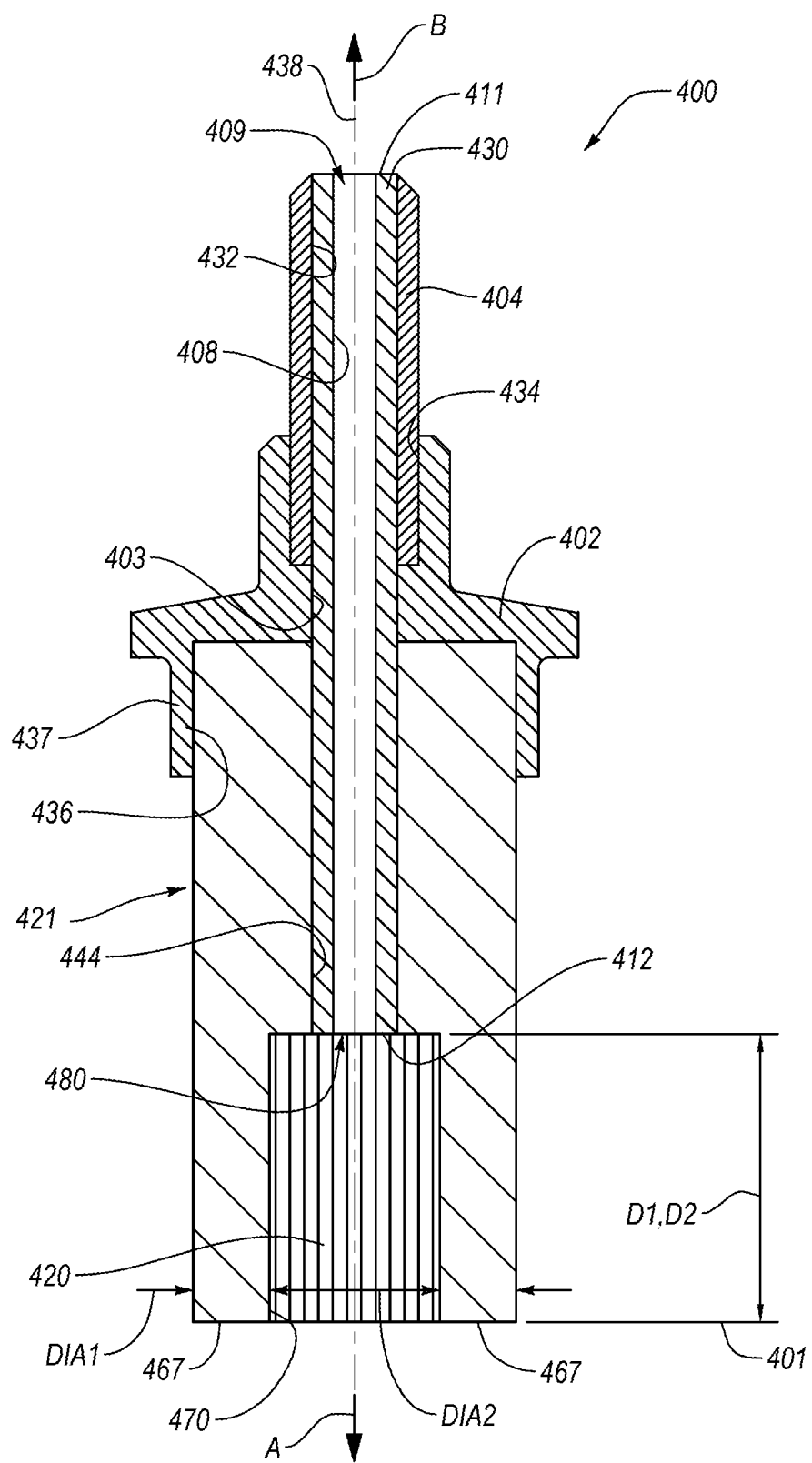
Figure 4B:
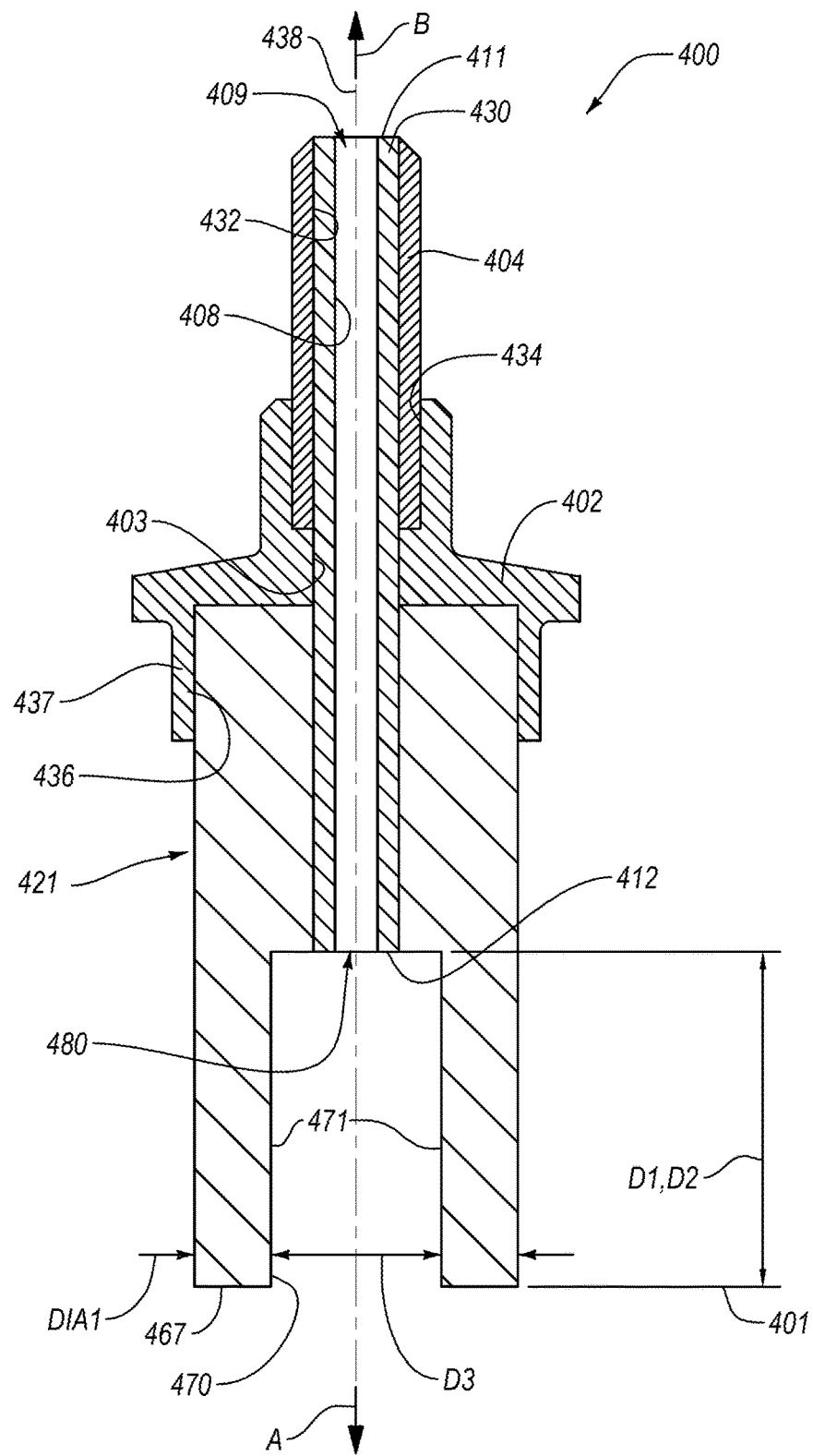
Figure 5:
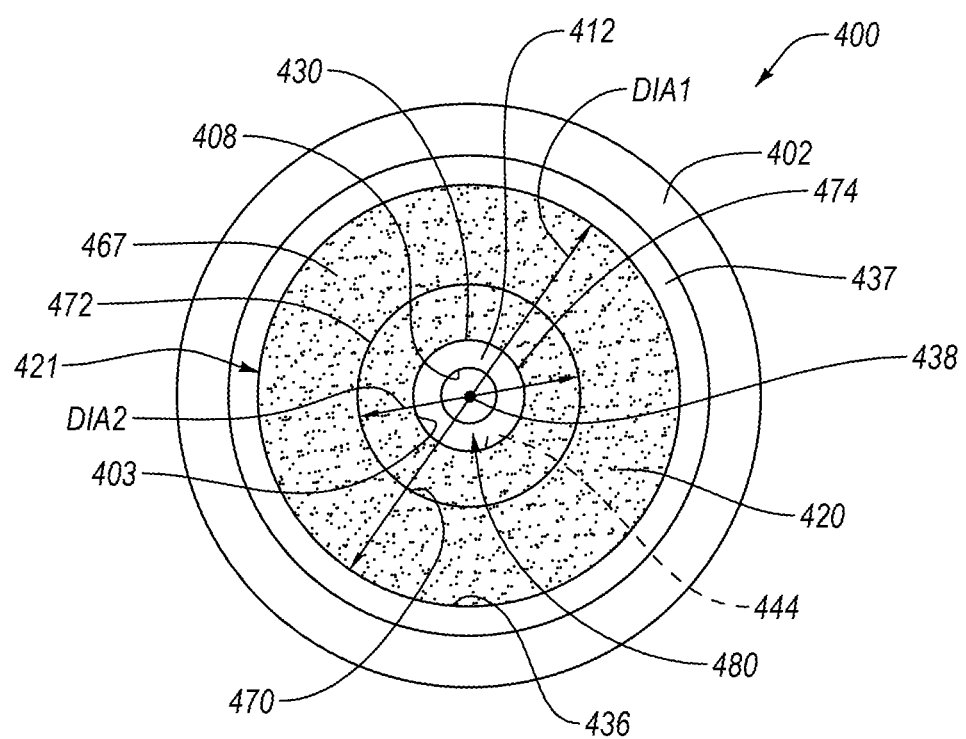
Figure 6:
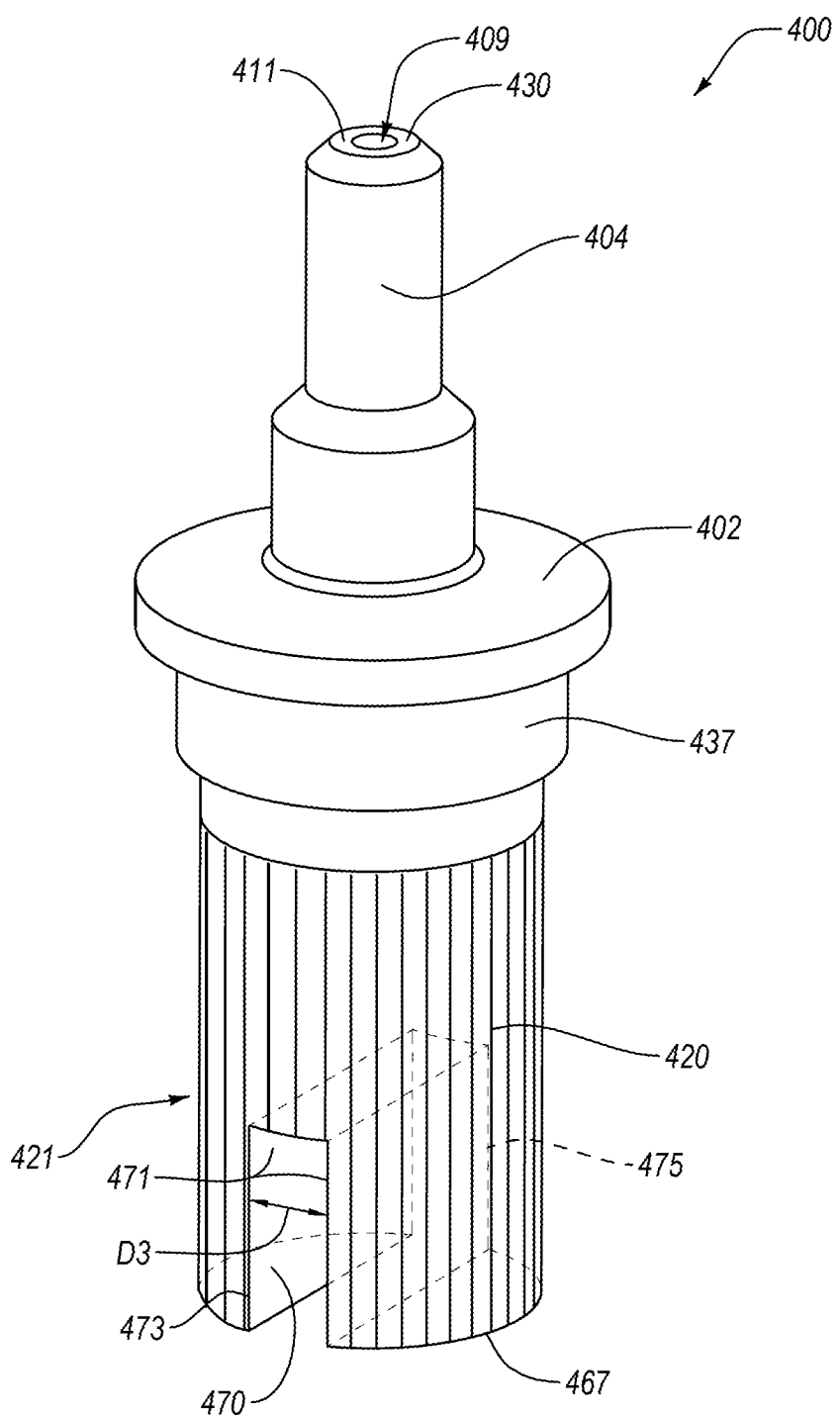
Figure 7:
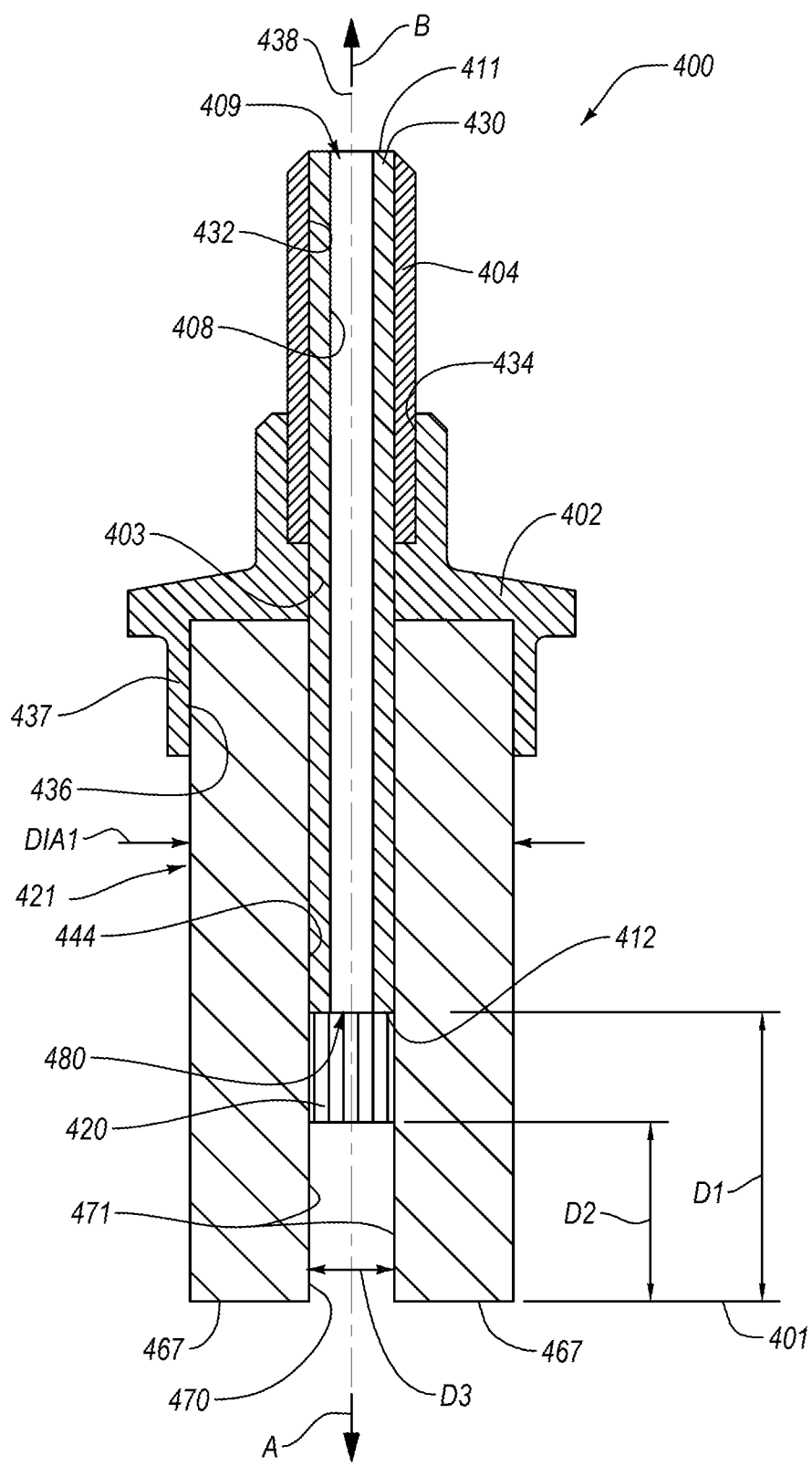
Figure 8:
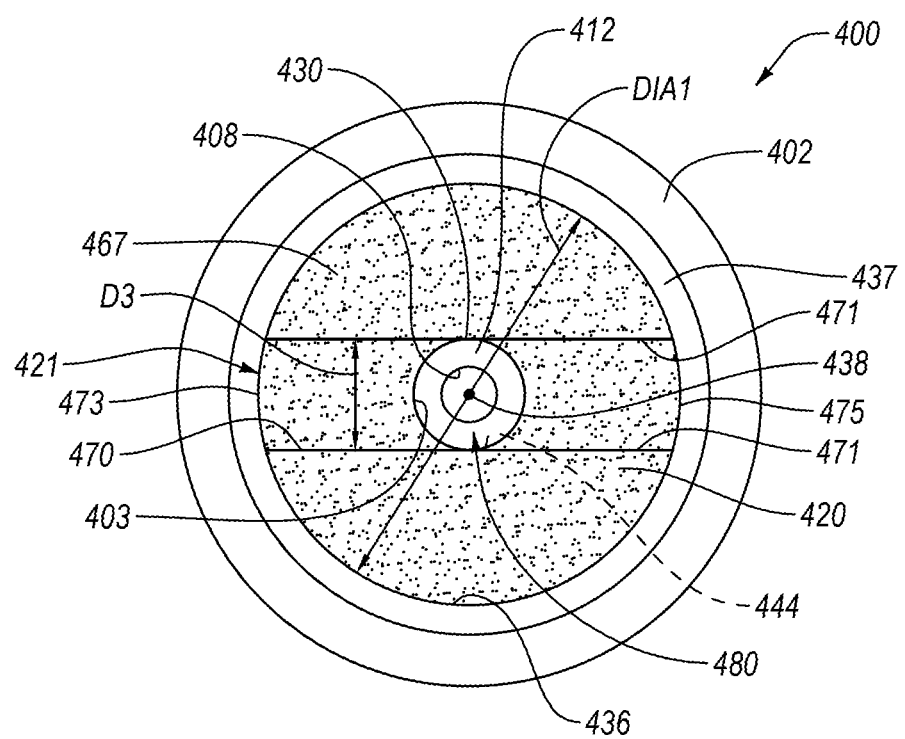
Figure 9:
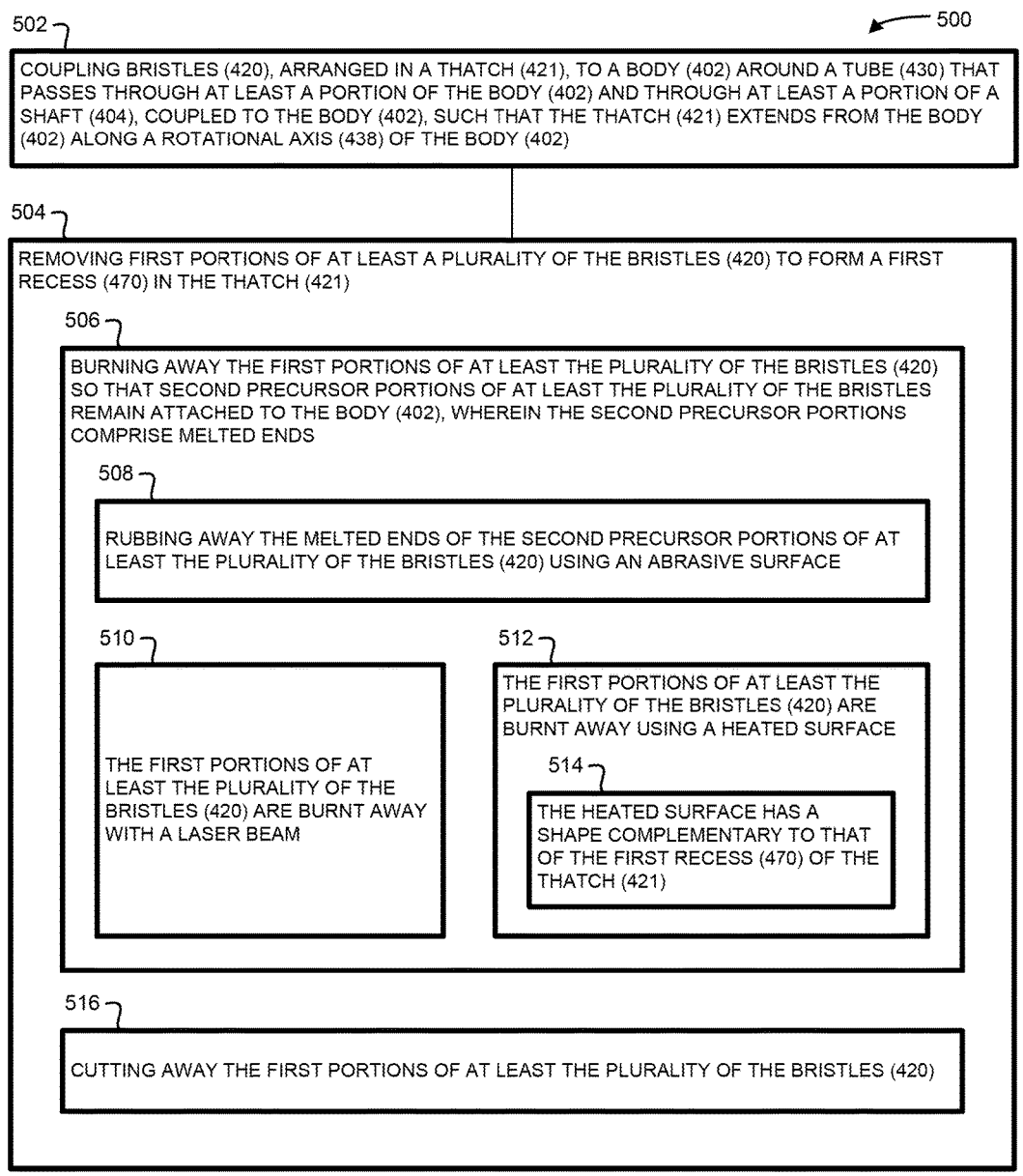
Figure 10:
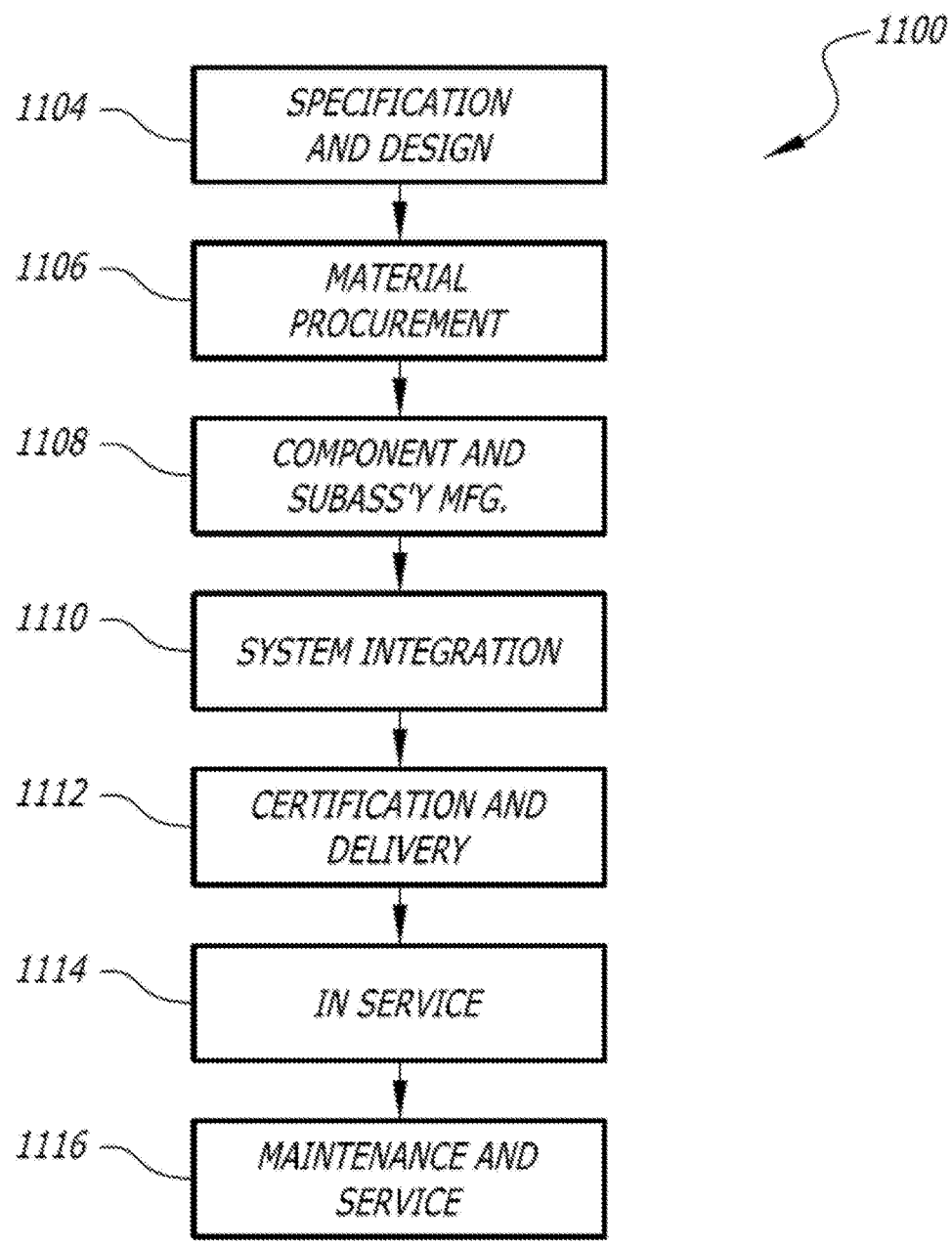
Figure 11:
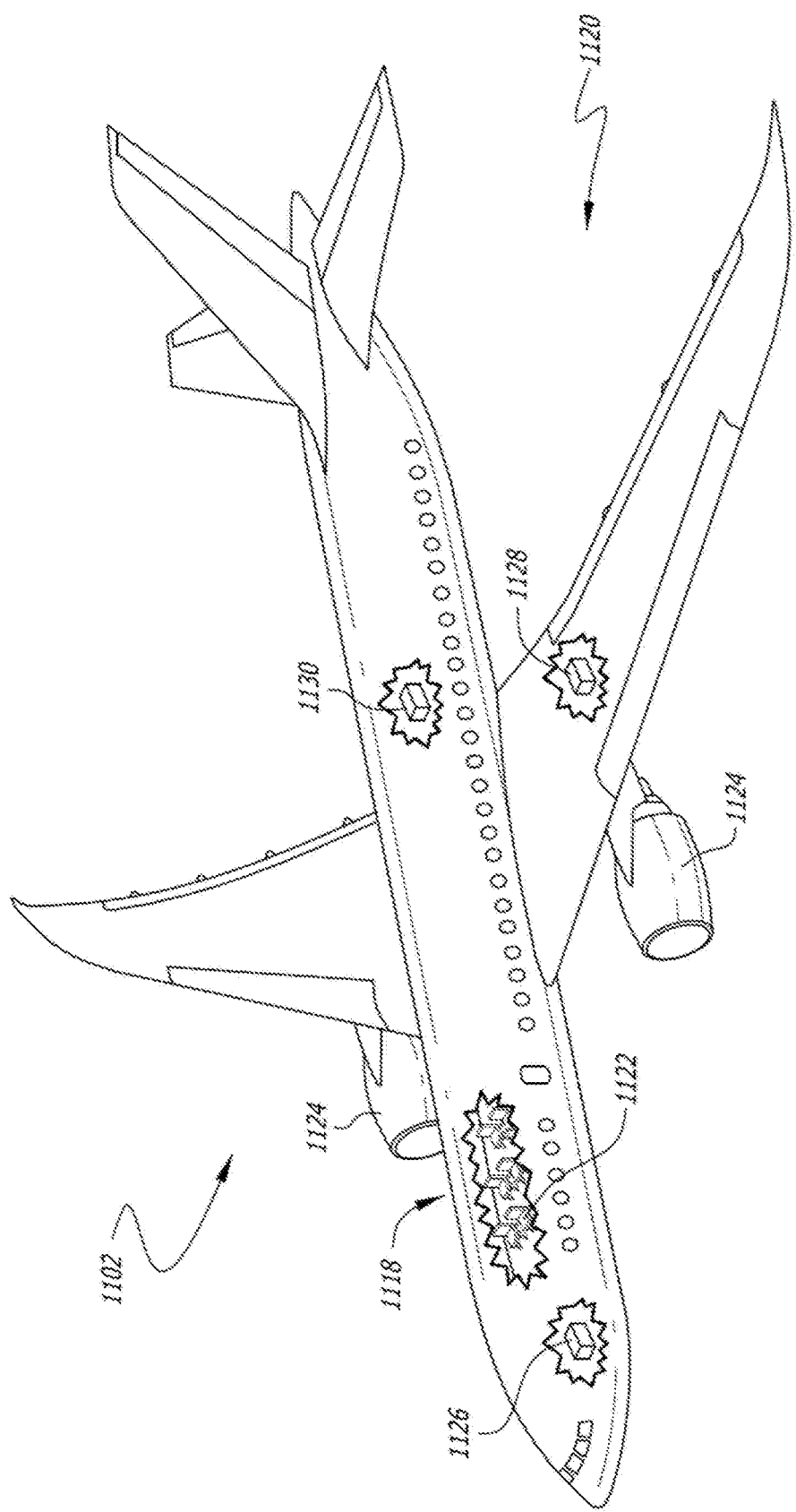

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a brush for delivering a glutinous substance to a workpiece from an end-effector, according to one or more examples of the present disclosure;

FIG. 2 is a schematic, perspective view of the brush of FIG. 1, according to one or more examples of the present disclosure;

FIG. 3A is a schematic, cross-sectional side elevation view of the brush of FIG. 1, according to one or more examples of the present disclosure;

FIG. 3B is a schematic, cross-sectional side elevation view of the brush of FIG. 1, according to one or more examples of the present disclosure;

FIG. 4A is a schematic, cross-sectional side elevation view of the brush of FIG. 1, according to one or more examples of the present disclosure;

FIG. 4B is a schematic, cross-sectional side elevation view of the brush of FIG. 1, according to one or more examples of the present disclosure;

FIG. 5 is a schematic, bottom plan view of the brush of FIG. 1, according to one or more examples of the present disclosure;

FIG. 6 is a schematic, perspective view of the brush of FIG. 1, according to one or more examples of the present disclosure;

FIG. 7 is a schematic, cross-sectional side elevation view of the brush of FIG. 1, according to one or more examples of the present disclosure;

FIG. 8 is a schematic, bottom plan view of the brush of FIG. 1, according to one or more examples of the present disclosure;

FIG. 9 is a block diagram of a method of making a brush that is configured to deliver a glutinous substance to a workpiece from an end-effector, according to one or more examples of the present disclosure;

FIG. 10 is a block diagram of aircraft production and service methodology; and FIG. 11 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-8, brush 400 for delivering glutinous substance 168 to workpiece 170 from end-effector 102 is disclosed. Brush 400 comprises body 402, having rotational axis 438. Additionally, brush 400 comprises shaft 404, coupled to body 402 and coaxial with rotational axis 438. Shaft 404 is harder than body 402. Brush 400 further comprises tube 430, passing through at least a portion of body 402 and through at least a portion of shaft 404 and having first end 411 and second end 412, opposite first end 411. Tube 430 has an outer diameter, is softer than body 402, and comprises first channel 408, coaxial with rotational axis 438 and having inlet 409, located at first end 411 of tube 430, and outlet 480, opposite inlet 409, located at second end 412 of tube 430. Tube 430 extends from body 402, in first direction A along rotational axis 438, to second end 412. Brush 400 also comprises bristles 420, arranged in thatch 421 that surrounds a portion of tube 430. Bristles 420 extend from body 402 in first direction A. The preceding subject matter of this paragraph characterizes example 1 of the present disclosure.

Brush 400 is configured to facilitate ease and efficiency associated with the application of glutinous substances onto surfaces of workpieces. Shaft 404 of brush 400, being harder than body 402, promotes a durable engagement with end-effector 102. End-effector 102 rotates brush 400 while delivering glutinous substance 168 to brush 400. Shaft 404 accommodates the relatively high temperatures and frictional forces associated with rotation of brush 400 relative to end-effector 102 by reducing the impact of high temperatures and frictional forces on body 402 and withstanding degradation to shaft 404 under such high temperature and frictional forces. Tube 430 facilitates the flow of glutinous substance 168 from end-effector 102 to thatch 421 through body 402 and shaft 404. Moreover, tube 430, being softer than body 402, absorbs potential impacts with workpiece 170, while brush 400 delivers glutinous substance 168 to workpiece 170, more effectively than body 402. For example, tube 430 can be configured to flex upon an impact with workpiece 170 while brush 400 delivers glutinous substance 168 to workpiece 170. Extension of tube 430 from body 402, in first direction A along rotational axis 438, to second end 412 promotes more uniform delivery of glutinous substance 168 to bristles 420 along a length of bristles. Furthermore, extension of tube 430 from body 402, in first direction A along rotational axis 438, to second end 412 allows glutinous substance 168 to be delivered to thatch 421 closer to crown 467 of thatch 421, which helps to reduce splattering of glutinous substance 168 on workpiece 170. Additionally, extension of tube 430 from body 402, in first direction A along rotational axis 438, to second end 412 helps to ensure tube 430 impacts workpiece 170 before workpiece 170 impacts body 402 while brush 400 delivers glutinous substance 168 to workpiece 170. Surrounding the portion of tube 430 with bristles 420 allows tube 430 to extend from body 402 and deliver glutinous substance 168 to bristles 420 at location away from body 402.

In one example, body 402 is made of a relatively hard plastic, such as acrylonitrile butadiene styrene (ABS) plastic. According to one example, shaft 404 is made of a metal, such as aluminum or an aluminum alloy. In yet one example, tube 430 is made of a relatively soft plastic, such as Tygon® E-3603 polyvinyl chloride (PVC) plastic. According to one example, body 402 is made of a material with a hardness equal to or above Shore D: 85, and tube 430 is made of a material with a hardness equal to or below Shore A: 65. Accordingly, hardness, as used herein, is a material property.

Referring generally to FIG. 1 and particularly to, e.g., FIGS. 3A-4B and 7, at least some of bristles 420 of thatch 421 extend from body 402, in first direction A, a greater distance than second end 412 of tube 430. The preceding subject matter of this paragraph characterizes example 2 of the present disclosure, wherein example 2 also includes the subject matter according to example 1, above.

Extending at least some of bristles 420 of thatch 421 from body 402, in first direction A, a greater distance than second end 412 of tube 430 promotes delivery of glutinous substance 168 to crown 467 of thatch 421. Additionally, extending at least some of bristles 420 of thatch 421 from body 402, in first direction A, a greater distance than second end 412 of tube 430 facilitates avoidance of impacts between tube 430 and workpiece 170 while delivering glutinous substance 168 to workpiece 170 from thatch 421.

Referring generally to FIG. 1 and particularly to, e.g., FIGS. 3A-4B and 7, shaft 404 passes through at least a portion of body 402 and extends from body 402 in second direction B, opposite first direction A. The preceding subject matter of this paragraph characterizes example 3 of the present disclosure, wherein example 3 also includes the subject matter according to any one of examples 1 or 2, above.

Shaft 404 extending from body 402 in second direction B, opposite first direction A, makes accessible a portion of shaft 404 for engagement with end-effector 102. Also, Shaft 404 extending from body 402 in second direction B, opposite first direction A, allows for spatial separation between end-effector 102 and body 402.

Referring generally to FIG. 1 and particularly to, e.g., FIGS. 2-8, shaft 404 has a thermal conductivity greater than that of body 402. The preceding subject matter of this paragraph characterizes example 4 of the present disclosure, wherein example 4 also includes the subject matter according to any one of examples 1 to 3, above.

Having the thermal conductivity of shaft 404 be greater than that of body 402 promotes greater absorption of heat, generated by the relative rotation of brush 400 and end-effector 102 during the delivery of glutinous substance 168 to workpiece 170 from brush 400, by shaft 404 than body 402.

Referring generally to FIG. 1 and particularly to, e.g., FIGS. 3A-4B and 7, body 402 also comprises second channel 403, coaxial with rotational axis 438. Shaft 404 comprises third channel 432, coaxial with rotational axis 438. Tube 430 is fixed within at least one of second channel 403 of body 402 or third channel 432 of shaft 404. The preceding subject matter of this paragraph characterizes example 5 of the present disclosure, wherein example 5 also includes the subject matter according to any one of examples 1 to 4, above.

Fixing tube 430 within at least one of second channel 403 of body 402 or third channel 432 of shaft 404 promotes coupling of tube 430 with body 402 or shaft 404 in a manner that allows flow of glutinous substance 168 through tube 430 while brush 400 rotates about rotational axis 438.

In one example, tube 430 is press-fit within at least one of second channel 403 of body 402 or third channel 432 of shaft 404. According to an example, at least a portion of tube 430 is fixed within at least one of second channel 403 of body 402 or third channel 432 of shaft 404 with an adhesive, such as a bonding adhesive.

Referring generally to FIG. 1 and particularly to, e.g., FIGS. 3A-4B and 7, body 402 also comprises third recess 434. A portion of shaft 404 is fixed within third recess 405 of body 402. The preceding subject matter of this paragraph characterizes example 6 of the present disclosure, wherein example 6 also includes the subject matter according to any one of examples 1 to 5, above.

Fixing a portion of shaft 404 within third recess 405 of body 402 promotes secure coupling of shaft 404 to body 402. Moreover, in one example, third recess 405 of body 402 facilitates the retention of shaft 404 in co-axial alignment with body 402.

In one example, shaft 404 is fixed within third recess 405 of body 402 with an adhesive, such as a bonding adhesive.

Referring generally to FIG. 1 and particularly to, e.g., FIGS. 3A-4B, 7, and 8, body 402 also comprises wall 437 and fourth recess 436, at least partially defined by wall 437. A portion of thatch 421 of bristles 420 is received within fourth recess 436 of body 402 between wall 437 and tube 430. The preceding subject matter of this paragraph characterizes example 7 of the present disclosure, wherein example 7 also includes the subject matter according to any one of examples 1 to 6, above.

Fourth recess 436 of body 402 facilitates secure coupling of the portion of thatch 421 of bristles 420 to body 402.

In one example, a portion of thatch 421 of bristles 420 is fixed within fourth recess 436 of body 402 with an adhesive, such as a bonding adhesive.

Referring generally to FIG. 1 and particularly to, e.g., FIGS. 3A-6 and 8, thatch 421 of bristles 420 comprises crown 467. Only some of bristles 420 extend from body 402, in first direction A, to crown 467 of thatch 421 so that first recess 470 is formed in thatch 421. The preceding subject matter of this paragraph characterizes example 8 of the present disclosure, wherein example 8 also includes the subject matter according to any one of examples 1 to 7, above.

First recess 470 formed in thatch 421 facilitates uniform distribution of glutinous substance 168 from tube 430 to thatch 421. For example, glutinous substance 168 from tube 430 collects within first recess 470 formed in thatch 421. Rotation of brush 400 urges, via centrifugal force, glutinous substance 168 within first recess 470 radially outward away from rotational axis 438 into uniform contact with thatch 421 along length of thatch 421.

Referring generally to FIG. 1 and particularly to, e.g., FIGS. 3A, 4A, and 5, first recess 470 of thatch 421 is coaxial with rotational axis 438 and has first circular cross-section 472 in a plane perpendicular to rotational axis 438 of body 402. The preceding subject matter of this paragraph characterizes example 9 of the present disclosure, wherein example 9 also includes the subject matter according to example 8, above.

First recess 470 of thatch 421 being coaxial with rotational axis 438 and first circular cross-section 472 of first recess 470 of thatch 421 cooperatively promote uniform distribution of glutinous substance 168 from first recess 470 to thatch 421.

Referring generally to FIG. 1 and particularly to, e.g., FIGS. 3A, 4A, and 5, first recess 470 of thatch 421 has a larger diameter than the outer diameter of tube 430. The preceding subject matter of this paragraph characterizes example 10 of the present disclosure, wherein example 10 also includes the subject matter according to example 9, above.

First recess 470 of thatch 421 having a larger diameter than the outer diameter of tube 430 promotes an increased quantity of glutinous substance 168 able to be collected within first recess 470. Additionally, first recess 470 of thatch 421 having a larger diameter than the outer diameter of tube 430 facilitates the delivery of glutinous substance 168 to radially outward extents of thatch 421.

Referring generally to FIG. 1 and particularly to, e.g., FIGS. 2-3 and 10-12, second end 412 of tube 430 is located first distance D1 away, along rotational axis 238 of body 402, from virtual datum plane 401 that is perpendicular to rotational axis 402 of body 402 and is coplanar with crown 467 of thatch 421. First recess 470 of thatch 421 extends second distance D2 from virtual datum plane 401 along rotational axis 238 of body 402. First distance D1 is equal to second distance D2. The preceding subject matter of this paragraph characterizes example 11 of the present disclosure, wherein example 11 also includes the subject matter according to example 10, above.

First recess 470 of thatch 421 extending from virtual datum plane 401 an equal distance as the location of second end 412 of tube 430 from virtual datum plane 401 promotes an increase in the capacity of first recess 470 to collect glutinous substance 168.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 3A, 3B, and 7, second end 412 of tube 430 is located first distance D1 away, along rotational axis 238 of body 402, from virtual datum plane 401 that is perpendicular to rotational axis 402 of body 402 and is coplanar with crown 467 of thatch 421. First recess 470 of thatch 421 extends second distance D2 from virtual datum plane 401, along rotational axis 238 of body 402. First distance D1 is greater than second distance D2. Thatch 421 further comprises second recess 444 between second end 412 of tube 430 and first recess 470 of thatch 421. The preceding subject matter of this paragraph characterizes example 12 of the present disclosure, wherein example 12 also includes the subject matter according to example 10, above.

First recess 470 of thatch 421 extending from virtual datum plane 401 a distance less than that of the location of second end 412 of tube 430 from virtual datum plane 401, such that second recess 444 is between second end 412 of tube 430 and first recess 470 of thatch 421, allows first recess 470 to be formed in thatch 421 without obstruction from second end 412 of tube 430.

Referring generally to FIG. 1 and particularly to, e.g., FIGS. 3A, 3B, 5, 7, and 8, second recess 444 of thatch 421 has second circular cross-section 474 in a plane perpendicular to rotational axis 402 of body 402 and has a diameter equal to the outer diameter of tube 430. The preceding subject matter of this paragraph characterizes example 13 of the present disclosure, wherein example 13 also includes the subject matter according to example 12, above.

Second recess 444 of thatch 421 having second circular cross-section 474 in a plane perpendicular to rotational axis 402 of body 402 and having a diameter equal to the outer diameter of tube 430 allows second recess 444 to be formed by surrounding the portion of tube 430 with thatch 421.

Referring generally to FIG. 1 and particularly to, e.g., FIGS. 3B, 4B, 7, and 8, first recess 470 of thatch 421 comprises facing walls 471. The preceding subject matter of this paragraph characterizes example 14 of the present disclosure, wherein example 14 also includes the subject matter according to example 8, above.

Facing walls 471 of first recess help define a channel through which glutinous substance 168 can flow from tube 430 to thatch 421.

Referring generally to FIG. 1 and particularly to, e.g., FIGS. 3B, 4B, 7, and 8, facing walls 471 of first recess 470 of thatch 421 are planar. The preceding subject matter of this paragraph characterizes example 15 of the present disclosure, wherein example 15 also includes the subject matter according to example 14, above.

Planarity of facing walls 471 of first recess 470 of thatch 421 promotes a direct flow path of glutinous substance 168 through first recess 470 from tube 430 to thatch 421. Additionally, planarity of facing walls 471 of first recess of thatch 421 facilitates flow of glutinous substance 168 radially outward away from rotational axis, via centrifugal force, as brush 400 rotates.

In another example, facing walls 471 of first recess 470 of thatch 421 are non-planar.

Referring generally to FIG. 1 and particularly to, e.g., FIGS. 3B, 4B, 7, and 8, facing walls 471 of first recess 470 of thatch 421 are parallel to each other and rotational axis 438. The preceding subject matter of this paragraph characterizes example 16 of the present disclosure, wherein example 16 also includes the subject matter according to any one of examples 14 or 15, above.

Facing walls 471 of first recess 470 of thatch 421 being parallel to each other and rotational axis 438 promote uniform flow of glutinous substance 168 through first recess 470 from tube 430 to thatch 421.

Referring generally to FIG. 1 and particularly to, e.g., FIG. 4B, second end 412 of tube 430 is located first distance D1 away, along rotational axis 238 of body 402, from virtual datum plane 401 that is perpendicular to rotational axis 402 of body 402 and is coplanar with crown 467 of thatch 421. First recess 470 of thatch 421 extends second distance D2 from virtual datum plane 401 along rotational axis 238 of body 402. First distance D1 is equal to second distance D2. The preceding subject matter of this paragraph characterizes example 17 of the present disclosure, wherein example 17 also includes the subject matter according to any one of examples 14 to 16, above.

First recess 470 of thatch 421 extending from virtual datum plane 401 an equal distance as the location of second end 412 of tube 430 from virtual datum plane 401 promotes an increase in the capacity of first recess 470 to collect glutinous substance 168.

Referring generally to FIG. 1 and particularly to, e.g., FIGS. 4A and 7, second end 412 of tube 430 is located first distance D1 away, along rotational axis 238 of body 402, from virtual datum plane 401 that is perpendicular to rotational axis 402 of body 402 and is coplanar with crown 467 of thatch 421. First recess 470 of thatch 421 extends second distance D2 from virtual datum plane 401 along rotational axis 238 of body 402. First distance D1 is greater than second distance D2. Brush 400 further comprises second recess 444 in thatch 421 between second end 412 of tube 430 and first recess 470 of thatch 421. The preceding subject matter of this paragraph characterizes example 18 of the present disclosure, wherein example 18 also includes the subject matter according to any one of examples 14 to 16, above.

First recess 470 of thatch 421 extending from virtual datum plane 401 a distance less than that of the location of second end 412 of tube 430 from virtual datum plane 401, such that second recess 444 is between second end 412 of tube 430 and first recess 470 of thatch 421, allows first recess 470 to be formed in thatch 421 without obstruction from second end 412 of tube 430.

Referring generally to FIG. 1 and particularly to, e.g., FIGS. 6 and 8, first recess 470 further comprises first open end 473 and second open end 475, opposite first open end 473. The preceding subject matter of this paragraph characterizes example 19 of the present disclosure, wherein example 19 also includes the subject matter according to any one of examples 14 to 18, above.

First open end 473 and second open end 475 of first recess 470 facilitate flow of glutinous substance 168 out of first recess 470 radially outward away from rotational axis, via centrifugal force, as brush 400 rotates.

Referring generally to FIG. 1 and particularly to, e.g., FIGS. 2-3 and 7-9, shortest distance D3, in a plane perpendicular to rotational axis 438, between facing walls 471 of first recess 470 is equal to the outer diameter of tube 430. The preceding subject matter of this paragraph characterizes example 20 of the present disclosure, wherein example 20 also includes the subject matter according to any one of examples 14 to 19, above.

Shortest distance D3 between facing walls 471 of first recess 470 being equal to the outer diameter of tube 430 facilitates uniform flow of glutinous substance 168 from tube 430 through first recess 470.

Referring generally to FIG. 1 and particularly to, e.g., FIGS. 2-3 and 14, shortest distance D3, in a plane perpendicular to rotational axis 438, between facing walls 471 of first recess 470 is greater than the outer diameter of tube 430. The preceding subject matter of this paragraph characterizes example 21 of the present disclosure, wherein example 21 also includes the subject matter according to any one of examples 14 to 19, above.

Shortest distance D3 between facing walls 471 of first recess 470 being greater than the outer diameter of tube 430 facilitates an increase in flow capacity of glutinous substance 168 through first recess 470.

Referring generally to FIGS. 1 and 3A-8 and particularly to FIG. 9, method 500 of making brush 400, configured to deliver glutinous substance 168 to workpiece 170 from end-effector 102, is disclosed. Method 500 comprises (block 502) coupling bristles 420, arranged in thatch 421, to body 402 around tube 430 that passes through at least portion of body 402 and through at least a portion of shaft 404, coupled to body 402, such that thatch 421 extends from body 402 along rotational axis 438 of body 402. Additionally, method 500 comprises (block 504) removing first portions of at least a plurality of bristles 420 to form first recess 470 in thatch 421. The preceding subject matter of this paragraph characterizes example 22 of the present disclosure.

Method 500 facilitates the making of brush 400 that is configured to facilitate ease and efficiency associated with the application of glutinous substances onto surfaces of workpieces. Tube 430 facilitates the flow of glutinous substance 168 from end-effector 102 to thatch 421 through body 402 and shaft 404. Bristles 420, coupled to body 402 and arranged in thatch 421, provide full and uniform coverage of glutinous substance 168 from end-effector 102 to workpiece 170. Coupling bristles 420 to body 402 around tube 430 allows tube 430 to extend from body 402 and deliver glutinous substance 168 to bristles 420 at location away from body 402. Removing first portions of at least a plurality of bristles 420 to form first recess 470 in thatch 421 promotes ease in forming first recess 470, which facilitates uniform distribution of glutinous substance 168 from tube 430 to thatch 421. For example, removing first portions of at least a plurality of bristles 420, after bristles 420 are coupled to body 402 and arranged in thatch 421, to form first recess 470 in thatch 421 promotes accurate and precise formation of first recess 470 in thatch 421.

Referring generally to, e.g., FIGS. 1 and 3A-8 and particularly to FIG. 9, according to method (500), removing the first portions of at least the plurality of bristles 420 comprises (block 506) burning away the first portions of at least the plurality of bristles 420 so that second precursor portions of at least the plurality of bristles 420 remain attached to body 402. The second precursor portions comprise melted ends. The preceding subject matter of this paragraph characterizes example 23 of the present disclosure, wherein example 23 also includes the subject matter according to example 22, above.

Burning away the first portions of at least the plurality of bristles 420 provides an efficient, inexpensive, and labor-reducing way to remove the first portions of at least the plurality of bristles 420 to form first recess 470 in thatch 421.

Referring generally to, e.g., FIGS. 1 and 3A-8 and particularly to FIG. 9, according to method (500), removing the first portions of at least the plurality of bristles 420 further comprises (block 508) rubbing away the melted ends of the second precursor portions of at least the plurality of bristles 420 using an abrasive surface. The preceding subject matter of this paragraph characterizes example 24 of the present disclosure, wherein example 24 also includes the subject matter according to example 23, above.

Rubbing the melted ends of the second precursor portions of at least the plurality of bristles 420 using the abrasive surface facilitates the precise removal of the melted ends of the second precursor portions from at least the plurality of bristles 420.

The abrasive surface can be any of various surfaces having friction-inducing features, such as relative sharp surface undulations or protuberances. In some examples, the abrasive surface is sand paper having a grit sufficient to remove the melted ends of the second precursor portions of at least the plurality of bristles 420. Rubbing away the melted ends of the second precursor portions of at least the plurality of bristles 420 using the abrasive surface may include positioning the melted ends in contact with the abrasive surface, and while in contact, repeatedly moving the melted ends back and forth along the abrasive surface with enough force that only the melted ends are removed from the second precursor portions.

Referring generally to, e.g., FIGS. 1 and 3A-8 and particularly to FIG. 9, according to method (500), (block 510) the first portions of at least the plurality of bristles 420 are burnt away with a laser beam. The preceding subject matter of this paragraph characterizes example 25 of the present disclosure, wherein example 25 also includes the subject matter according to any one of examples 23 or 24, above.

Using a laser beam to burn away the first portions of at least the plurality of bristles 420 promotes accurate and precise formation of first recess 470 in thatch 421.

Referring generally to, e.g., FIGS. 1 and 3A-8 and particularly to FIG. 9, according to method (500), (block 512) the first portions of at least the plurality of bristles 420 are burnt away using a heated surface. The preceding subject matter of this paragraph characterizes example 26 of the present disclosure, wherein example 26 also includes the subject matter according to any one of examples 23 or 24, above.

Burning away the first portions of at least the plurality of bristles 420 using a heated surface facilitates accurate and precise formation of first recess 470 in thatch 421. Additionally, using a heated surface to burn away the first portions of at least the plurality of bristles 420 promotes efficiency when forming first recesses 470 in thatches 421 of multiple brushes 400 in a repetitive process.

In some examples, the heated surface can be a surface of any of various objects made of a thermally conductive material heated to a temperature sufficient to controllably melt or burn bristles 420. In one example, the heated surface is made of a metal, such as steel, brass, and the like. According to an example, the heated surface is a heated surface of a branding-iron-type object.

Referring generally to, e.g., FIGS. 1 and 3A-8 and particularly to FIG. 9, according to method (500), (block 514)

the heated surface has a shape complementary to that of first recess 470 of thatch 421. The preceding subject matter of this paragraph characterizes example 27 of the present disclosure, wherein example 27 also includes the subject matter according to example 26, above.

The heated surface having a shape complementary to that of first recess 470 of thatch 421 promotes forming first recess 470 to have the shape of the heated surface. In other words, the heated surface having a shape complementary to that of first recess 470 of thatch 421 would burn and remove only those portions of at least the plurality of bristles 420 that have the shape of first recess 470.

Referring generally to, e.g., FIGS. 1 and 3A-8 and particularly to FIG. 9, according to method (500), removing the first portions of at least the plurality of bristles 420 comprises (block 516) cutting away the first portions of at least the plurality of bristles 420. The preceding subject matter of this paragraph characterizes example 28 of the present disclosure, wherein example 28 also includes the subject matter according to example 22, above.

Cutting away the first portions of at least the plurality of bristles 420 to remove the first portions of at least the plurality of bristles 420 promotes clean and precise removal of the first portions of at least the plurality of bristles 420.

In some examples, the first portions of at least the plurality of bristles 420 are cut away using scissors, knives, or other sharply bladed instruments.

Examples of the present disclosure may be described in the context of aircraft manufacturing and service method 1100 as shown in FIG. 10 and aircraft 1102 as shown in FIG. 11. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A brush for delivering a glutinous substance to a workpiece from an end-effector, the brush comprising:
   a body, having a rotational axis;
   a shaft, coupled to the body and coaxial with the rotational axis, wherein the shaft has a higher material hardness than the body;
   a tube, passing through at least a portion of the body and through at least a portion of the shaft and having a first end and a second end, opposite the first end, wherein:
      the tube has an outer diameter;
      the tube has a lower material hardness than the body;
      the tube comprises a first channel, coaxial with the rotational axis and having an inlet, located at the first end of the tube, and an outlet, opposite the inlet, located at the second end of the tube; and
      the tube extends from the body, in a first direction along the rotational axis, to the second end; and
   bristles, arranged in a thatch that surrounds a portion of the tube, wherein the bristles extend from the body in the first direction.

2. The brush according to claim 1, wherein at least some of the bristles of the thatch extend from the body, in the first direction, a greater distance than the second end of the tube.

3. The brush according to claim 1, wherein:
   the body further comprises a second channel, coaxial with the rotational axis;
   the shaft comprises a third channel, coaxial with the rotational axis; and the tube is fixed within at least one of the second channel of the body or the third channel of the shaft.

4. The brush according to claim 1, wherein:
the body further comprises a wall and a fourth recess, at least partially defined by the wall; and
a portion of the thatch of the bristles is received within the fourth recess of the body between the wall and the tube.

5. The brush according to claim 1, wherein:
the thatch of the bristles comprises a crown; and
only some of the bristles extend from the body, in the first direction, to the crown of the thatch so that a first recess is formed in the thatch.

6. The brush according to claim 5, wherein the first recess of the thatch is coaxial with the rotational axis and has a first circular cross-section in a plane perpendicular to the rotational axis of the body.

7. The brush according to claim 6, wherein the first recess of the thatch has a larger diameter than the outer diameter of the tube.

8. The brush according to claim 7, wherein:
the second end of the tube is located a first distance away, along the rotational axis of the body, from a virtual datum plane that is perpendicular to the rotational axis of the body and is coplanar with the crown of the thatch;
the first recess of the thatch extends a second distance from the virtual datum plane along the rotational axis of the body; and
the first distance is equal to the second distance.

9. The brush according to claim 7, wherein:
the second end of the tube is located a first distance away, along the rotational axis of the body, from a virtual datum plane that is perpendicular to the rotational axis of the body and is coplanar with the crown of the thatch;
the first recess of the thatch extends a second distance from the virtual datum plane, along the rotational axis of the body;
the first distance is greater than the second distance; and
the thatch further comprises a second recess between the second end of the tube and the first recess of the thatch.

10. The brush according to claim 9, wherein the second recess of the thatch has a second circular cross-section in a plane perpendicular to the rotational axis of the body and has a diameter equal to the outer diameter of the tube.

11. The brush according to claim 5, wherein the first recess of the thatch comprises facing walls.

12. The brush according to claim 11, wherein:
the second end of the tube is located a first distance away, along the rotational axis of the body, from a virtual datum plane that is perpendicular to the rotational axis of the body and is coplanar with the crown of the thatch;
the first recess of the thatch extends a second distance from the virtual datum plane along the rotational axis of the body; and
the first distance is equal to the second distance.

13. The brush according to claim 11, wherein:
the second end of the tube is located a first distance away, along the rotational axis of the body, from a virtual datum plane that is perpendicular to the rotational axis of the body and is coplanar with the crown of the thatch;
the first recess of the thatch extends a second distance from the virtual datum plane along the rotational axis of the body;
the first distance is greater than the second distance; and
the brush further comprises a second recess in the thatch between the second end of the tube and the first recess of the thatch.

14. The brush according to claim 11, wherein a shortest distance, in a plane perpendicular to the rotational axis, between the facing walls of the first recess is equal to the outer diameter of the tube.

15. The brush according to claim 11, wherein a shortest distance, in a plane perpendicular to the rotational axis, between the facing walls of the first recess is greater than the outer diameter of the tube.

16. The brush according to claim 11, wherein the facing walls of the first recess of the thatch are planar.

17. The brush according to claim 11, wherein the facing walls of the first recess of the thatch are parallel to each other and the rotational axis.

18. The brush according to claim 11, wherein the first recess further comprises a first open end and a second open end, opposite the first open end.

19. The brush according to claim 1, wherein the shaft passes through at least a portion of the body and extends from the body in a second direction, opposite the first direction.

20. The brush according to claim 1, wherein the shaft has a thermal conductivity greater than that of the body.

21. The brush according to claim 1, wherein:
the body further comprises a third recess; and
a portion of the shaft is fixed within the third recess of the body.

22. A method of making a brush, configured to deliver a glutinous substance to a workpiece from an end-effector, the method comprising:
coupling bristles, arranged in a thatch, to a body around a tube that passes through at least a portion of the body and through at least a portion of a shaft, coupled to the body, such that the thatch extends from the body along a rotational axis of the body; and
removing first portions of at least a plurality of the bristles to form a first recess in the thatch.

23. The method according to claim 22, wherein removing the first portions of at least the plurality of the bristles comprises burning away the first portions of at least the plurality of the bristles so that second precursor portions of at least the plurality of the bristles remain attached to the body, wherein the second precursor portions comprise melted ends.

24. The method according to claim 23, wherein removing the first portions of at least the plurality of the bristles further comprises rubbing away the melted ends of the second precursor portions of at least the plurality of the bristles using an abrasive surface.

25. The method according to claim 23, wherein the first portions of at least the plurality of the bristles are burnt away using a heated surface.

26. The method according to claim 25, wherein the heated surface has a shape complementary to that of the first recess of the thatch.

27. The method according to claim 23, wherein the first portions of at least the plurality of the bristles are burnt away with a laser beam.

28. The method according to claim 22, wherein removing the first portions of at least the plurality of the bristles comprises cutting away the first portions of at least the plurality of the bristles.

* * * * *